United States Patent
Zhao et al.

(10) Patent No.: US 10,572,146 B2
(45) Date of Patent: Feb. 25, 2020

(54) ELECTRONIC DEVICE AND METHOD FOR RECEIVING AND DISPLAYING USER GESTURE INPUTS IN ACCORDANCE WITH ONE OF MULTIPLE OPERATION TYPES

(71) Applicant: Lenovo (Beijing) Limited, Beijing (CN)

(72) Inventors: Yonggang Zhao, Beijing (CN); Xiaoping Zhang, Beijing (CN); Qiang Yao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 153 days.

(21) Appl. No.: 15/367,400

(22) Filed: Dec. 2, 2016

(65) Prior Publication Data

US 2017/0160920 A1    Jun. 8, 2017

(30) Foreign Application Priority Data

Dec. 3, 2015    (CN) .......................... 2015 1 0875140

(51) Int. Cl.
*G06F 3/14* (2006.01)
*G06F 3/0488* (2013.01)
*G06F 3/041* (2006.01)
*G06F 17/27* (2006.01)
*G06K 9/00* (2006.01)

(52) U.S. Cl.
CPC ........ *G06F 3/04883* (2013.01); *G06F 3/0416* (2013.01); *G06F 17/2785* (2013.01); *G06K 9/00416* (2013.01)

(58) Field of Classification Search
CPC ..................................... G06F 3/14; G06F 3/17

USPC .................. 715/700, 863; 704/9; 345/156
See application file for complete search history.

(56) References Cited

U.S. PATENT DOCUMENTS

| | | | |
|---|---|---|---|
| 2011/0001694 A1* | 1/2011 | Homma | G06F 3/0485 345/156 |
| 2013/0138424 A1* | 5/2013 | Koenig | G06F 17/271 704/9 |
| 2014/0007022 A1* | 1/2014 | Tocino Diaz | G06F 3/017 715/863 |
| 2017/0090560 A1* | 3/2017 | Chen | G06F 3/013 |
| 2019/0179529 A1* | 6/2019 | Howard | G06F 3/04883 |

FOREIGN PATENT DOCUMENTS

| | | |
|---|---|---|
| CN | 103294375 A | 9/2013 |
| CN | 103677622 A | 3/2014 |
| CN | 104007914 A | 8/2014 |

(Continued)

*Primary Examiner* — Ruay Ho
(74) *Attorney, Agent, or Firm* — Kunzler Bean & Adamson

(57) ABSTRACT

An electronic device is disclosed. The electronic device may include a touch display unit that receives and displays user gesture inputs. The electronic device may include a processor coupled to the touch display unit. Upon the touch display unit receiving a user gesture input, the processor may acquire the user gesture input from the touch display unit and determine an operation type from multiple operation types of the user gesture input based on one or more properties of the user gesture input. Upon the touch display unit receiving a user gesture input, the touch display unit may display the user gesture input in accordance with the operation type of the user gesture input as determined by the processor.

18 Claims, 6 Drawing Sheets

(56) References Cited

FOREIGN PATENT DOCUMENTS

| CN | 104317426 A | 1/2015 |
|---|---|---|
| CN | 104750751 A | 7/2015 |
| CN | 104978577 A | 10/2015 |

\* cited by examiner

ELECTRONIC DEVICE AND METHOD FOR RECEIVING AND DISPLAYING USER GESTURE INPUTS IN ACCORDANCE WITH ONE OF MULTIPLE OPERATION TYPES

FIELD

The subject matter disclosed herein relates to electronic devices, and in particular, to receiving and displaying user gesture inputs on an electronic device.

BACKGROUND

Many electronic devices accept handwriting input from a user via a touchscreen. However, a device may not be able to determine whether some user input on the touchscreen is a handwriting input operation or another type of input operation (such as an underlining operation). The device operating on a user's input operation as though it were a handwriting operation may confuse the user and reduce the user's efficiency when using the device.

SUMMARY

One embodiment of the present disclosure includes an electronic device. The electronic device may include a touch display unit that receives and displays user gesture inputs. The electronic device may include a processor coupled to the touch display unit. In one embodiment, upon the touch display unit receiving a user gesture input, the processor may acquire the user gesture input from the touch display unit and determine an operation type from multiple operation types of the user gesture input based on one or more properties of the user gesture input. Upon the touch display unit receiving a user gesture input, the touch display unit may display the user gesture input in accordance with the operation type of the user gesture input as determined by the processor.

In one embodiment, the multiple operation types may include a first operation type relating to the user gesture input being an independent stroke operation and a second operation type relating to the user gesture being a stroke operation that is interdependent upon one or more previous stroke operations. In one embodiment, the first operation type inputs one or more character contents and the second operation type inputs one or more non-character contents.

In some embodiments, the at least one property of the user gesture input may include a color, a thickness, a shape, or a duration of the user gesture input. In one embodiment, the processor determining the operation type of the user gesture input based on the at least one property may include the processor determining whether the property satisfies a preset condition, in response to determining that the property satisfies the preset condition, determining that the user gesture input is a first operation type, and in response to determining that the property does not satisfy the preset condition, determining that the user gesture input is a second operation type.

In one embodiment, the processor determining the operation type of the user gesture input based on at least one property may include, in response to the processor determining the operation type is the first operation type, adding a trajectory of the user gesture input to a trajectory library, performing semantic identification on the user gesture input, and outputting text identified based on the semantic identification to the touch display. In on embodiment, the processor determining the operation type of the user gesture input based on at least one property may include in response to the processor determining the operation type is the second operation type, removing the trajectory of the user gesture input from the trajectory library, and performing the semantic identification on the remaining trajectories of the trajectory library. In some embodiments, the processor may determine a semantic content corresponding to an operation of the first operation type at a position corresponding to the gesture of the user gesture input and may perform an operation on the semantic content.

In one embodiment, the processor performing the operation on the semantic content may include the processor marking the semantic content. Performing the operation on the semantic content may include keeping the trajectory of the user gesture input unchanged, and displaying the trajectory on the semantic content, controlling the semantic content to be displayed with an effect different from one or more other contents or aggregating multiple semantic contents corresponding to multiple operations of the second operation type, the multiple operations being the same, to generate a new paragraph.

Another embodiment of the present disclosure includes a method. The method may include receiving a user gesture input. The method may include determining an operation type from multiple operation types of the user gesture input based on one or more properties of the user gesture input. The method may include displaying the user gesture input in accordance with the operation type of the user gesture input.

In one embodiment, the multiple operation types may include a first operation type relating to the user gesture input being an independent stroke operation and a second operation type relating to the user gesture input being a stroke operation that is interdependent upon one or more previous stroke operations. In some embodiments, the first operation type inputs one or more character contents while the second operation type inputs one or more non-character contents. In one embodiment, the property may include a color, a thickness, a shape, or a duration of the user gesture input.

In one embodiment, determining the operation type to which the first input belongs based on the property of the first input may include determining whether the property satisfies a preset condition, in response to determining that the property satisfies the preset condition, determining that the first input is a first operation type, and in response to determining that the property does not satisfy a preset condition, determining that the first input is a second operation type. In some embodiments, determining the operation type to which the first input belongs based on the property of the first input may include, in response to determining that the first input is a first operation type, adding a trajectory of the first input to a trajectory library, performing semantic identification on the first input, and outputting text identified based on the semantic identification.

In one embodiment, determining the operation type to which the first input belongs based on the property of the first input may include, in response to the processor determining the operation type is the second operation type, removing the trajectory of the first input from the trajectory library, and performing the semantic identification on the remaining trajectories of the trajectory library.

In one embodiment, the method may include determining a semantic content corresponding to an operation of the first operation type at a position corresponding to the gesture of the first input, and performing the operation on the semantic content. In one embodiment, performing the operation on the semantic content may include marking the semantic content. Performing the operation on the semantic content may include keeping the trajectory of the first input unchanged, and displaying the first input on the semantic content, controlling the semantic content to be displayed with an effect different from other contents, or aggregating multiple semantic contents corresponding to multiple user gesture inputs.

One embodiment of the present disclosure includes a program product that may include a non-transitory computer readable storage medium that stores code executable by a processor. The executable code may include code to receive a user gesture input. The executable code may include code to determine an operation type from multiple operation types of the user gesture input based on one or more properties of the user gesture input. The executable code may include code to display the user gesture input in accordance with the operation type of the user gesture input.

In one embodiment, the multiple operation types may include a first operation type relating to the first input being an independent stroke operation and a second operation type relating to the first input being a stroke operation that is interdependent upon one or more previous stroke operations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
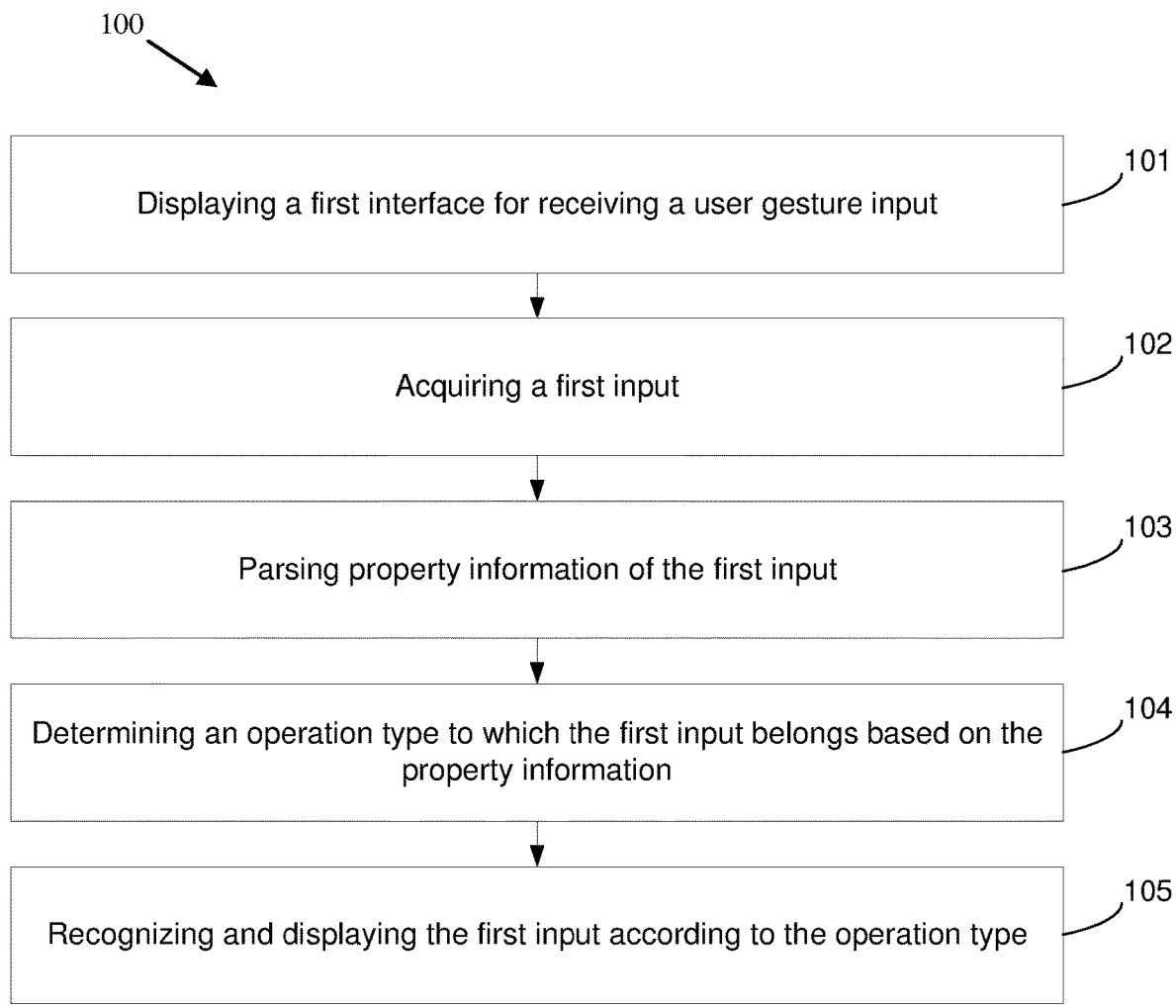
FIG. 1 is a flow diagram of an implementation of one embodiment of a method for an electronic device.

FIG. 1 is a flow diagram of an implementation of one embodiment of a method 100 for an electronic device. The method 100 may be applied to an electronic device capable of receiving a user gesture input and displaying the user gesture in real time. In one embodiment, the method 100 may include displaying 101 a first interface for receiving a user's input. The first interface may include the whole screen interface of a display screen, and may be a part of the whole screen interface. In one embodiment, the electronic device may at least support a handwriting input method, and the display screen of the electronic device may include a touch screen supporting a touch input.

The method 100 may include acquiring 102 a first input. The property information corresponding to the first input may include at least one or more of the following information: color, thickness, shape, duration of the user gesture input, system generation time, or ending time of a line. In some embodiments, the method 100 may include establishing a property information database which may store the property information. The property information stored may include a color, a thickness, a shape, a duration of a user gesture input, a system generation time, and/or an ending time of a line.

In one embodiment, the properties may refer to "stroke properties." The stroke properties may be applied to various kinds of lines, text, and/or elements. For example, the stroke properties may include a stroke-color, a stroke-width, a stroke-linecap, and/or a stroke-dasharray. Stroke-color properties may be used to define the outline color of the lines, text, and/or elements. Stroke-width properties may be used to define the thickness of the outline of the lines, text, and/or elements. Stroke-linecap properties may be used to define the different types of open path ends. Stroke-dasharray properties may be used to create dotted lines.

The method 100 includes parsing 103 the property information of the first input. In some embodiments, parsing 103 the property information of the first input may include detecting a touch point movement gesture on the touch screen, determining one continuous touch point movement gesture that is detected as one stroke, and/or parsing the property information of the stroke.

The method 100 may include determining 104 an operation type from multiple operation types to which the first input belongs based on the property of the first input. In some embodiments, determining 104 the operation type of the first input according to the property may include determining whether the property satisfies a preset condition. If the property satisfies the preset condition, the method 100 may determine that the first input is a first operation type. If the property does not satisfy the preset condition, the method 100 may determine that the first input is a second operation type.

In one embodiment, the first operation type may relate to the first input that may be an independent stroke operation of the handwriting input method used to input one or more characters. The second operation type may relate to the first input being a stroke that may be dependent upon a previous independent stroke. In some embodiments, the preset condition may be set before the user performs a gesture input.

The method 100 includes recognizing 105 and displaying the first input according to the operation type. In some embodiments, recognizing 105 the first input according to the operation type may include, if the operation type is the first operation type, adding the trajectory of the first input to a trajectory library on which a semantic identification is to be performed, performing the semantic identification on the first input, and outputting identified text.

If the method 100 determines that the first input is the first operation type, a handwriting stroke identification may be performed on the gesture of the first input to identify characters, symbols, letters, numbers, and/or the like that correlate or match with the gesture of the first input. In one embodiment, identifying the first input according to the operation type may include, if the operation type is the second operation type, removing the trajectory of the first input from the trajectory library on which the semantic identification is to be performed, and performing the semantic identification on the remaining trajectories.

In one embodiment, when it is determined that the first input is the second operation type, the method 100 may recognize the gesture of the first input to recognize an identification correlated or matched with the gesture of the first input. In one embodiment, the gesture of the first input may be related to an earlier input, for example in the form of an underlining operation and/or a punctuating operation with respect to the earlier input, or the like.

For example, a user may use a tablet computer to write a proposal. One or more portions of the proposal may require later consideration. The user may identify the one or more portions that should be considered when the proposal is drafted preliminarily on the first interface of the tablet computer. The tablet computer may determine whether the property of a current input object satisfies a preset condition in response to an identification engine in the tablet computer receiving the user's handwriting input. The tablet computer may determine whether one or more character contents or one or more non-character contents should be input based on whether the property of the user input gesture satisfies the preset condition. The tablet computer may place font content and non-font content in suitable positions. In one embodiment, the tablet computer may place the non-font content with respect to one or more font contents, such that the drafted proposal may be self-explanatory, thereby greatly enhancing the user's experience.

In one embodiment, the electronic device may include an electronic device that supports handwriting input, such as, a tablet computer, a laptop, a mobile phone, a TV set, and the like.

The method 100 may include displaying 101 the first interface for receiving the user's input, and displaying the gesture of the input in real time. The method 100 may include acquiring 102 the first input and displaying the gesture of the first input. The method 100 may include parsing 103 the property information of the first input, determining 104 the operation type to which the first input belongs based on the property information, and identifying the first input according to the operation type. For example, the method 100 may determine whether the user's current operation is the handwriting stroke operation or another operation and thus may improve identification accuracy and enhance the user's experience.

Figure 2:
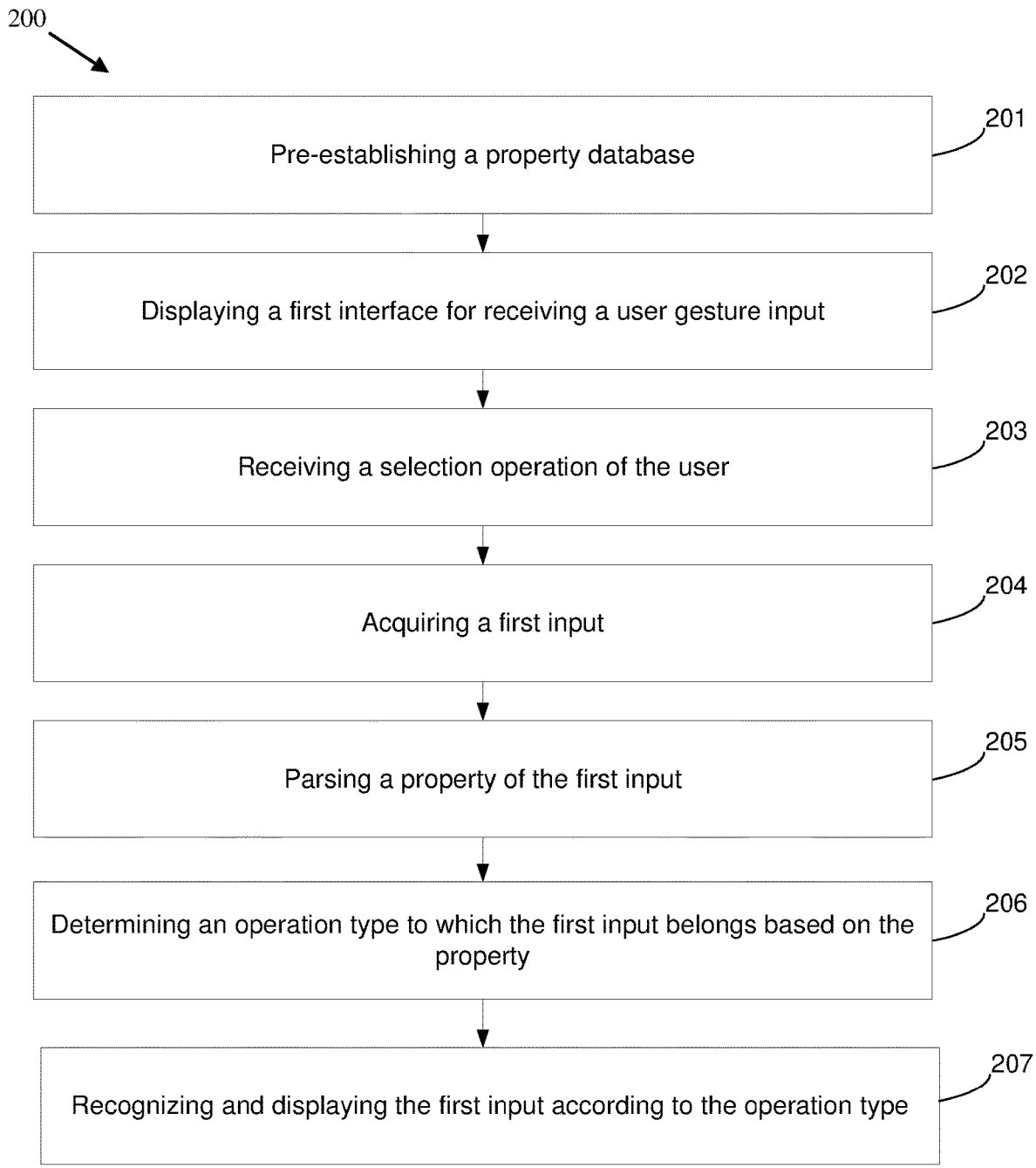
FIG. 2 is a flow diagram of an implementation of another embodiment of a method for an electronic device.

FIG. 2 is a schematic flow diagram of one embodiment of a method 200 for an electronic device. The method 200 may be applied to an electronic device capable of receiving a user's input and displaying a gesture of the input in real time. In one embodiment, the method 100 may include pre-establishing 201 a property information database which stores property information. In some embodiments, the property information may include a color, a thickness, a shape, a duration of a user gesture, a system generation time, and/or an ending time of a line.

The method 200 includes displaying 202 a first interface for receiving a user's input, and displaying a gesture of the input in real time. In one embodiment, the electronic device may support a handwriting input method, and the display screen of the electronic device may include a touch screen supporting a touch input.

The method 200 may include receiving 203 a selection operation of the user, wherein the selection operation is used to indicate the property information of various types of inputs. In some embodiments, the user may retrieve the property database on the first interface and select different property parameters for the first and second operation types respectively. In one embodiment, the first operation type may mean that the first input is a stroke operation of the handwriting input method and the second operation type may mean that the first input may include other operations distinguished from the stroke operation, e.g., the first input may represent an identification operation.

The method 200 may include acquiring 204 the first input, and displaying the gesture of the first input.

The method 200 may also include parsing 205 the property information of the first input. In some embodiments, parsing 205 the property of the first input may include detecting a touch point movement gesture on the touch screen, determining one continuous touch point movement gesture that is detected as one stroke, and parsing the property information of the stroke.

The method 200 includes determining 206 an operation type to which the first input belongs based on the property. In one embodiment, determining 206 the operation type of the first input according to the property information may include determining whether the property satisfies a first preset condition. If the property satisfies the first preset condition, the method 200 may determine that the first input is the first operation type. If the first preset condition is not satisfied, the method 200 may determine whether the property information satisfies a second preset condition. If the second preset condition is satisfied, the method may determine that the first input is the second operation type. In some embodiments, the first preset condition may include a set of property parameters set for the first operation type, and the second preset condition may include a set of property parameters set for the second operation type.

The method 200 may include recognizing 207 and displaying the first input according to the operation type. In one embodiment, recognizing 207 the first input according to the operation type may include, in response to the operation type being the first operation type, adding the trajectory of the first input to a trajectory library on which a semantic identification is to be performed, performing the semantic identification on the first input, and/or outputting identified text.

In some embodiments, in response to determining that the first input is the first operation type, a handwriting stroke identification may be performed on the gesture of the first input to identify characters, symbols, letters, numbers, and/or the like that are correlated or matched with the gesture of the first input.

In one embodiment, recognizing 207 the first input according to the operation type may include, if the operation type is the second operation type, removing the trajectory of the first input from the trajectory library on which the semantic identification is to be performed, and/or performing the semantic identification on the remaining trajectories.

In some embodiments, in response to determining that the first input is the second operation type, an identification distinguished from the handwriting stroke may be performed on the gesture of the first input to identify an identification correlated or matched with the gesture of the first input.

For example, the user may want to write a piece of code with a mobile phone. The font color of the handwriting stroke input may be set as "black" and the marking color may be set as "red" before the user performs the handwriting input on the mobile phone interface. The color of the current input object may be determined when the identification engine in the mobile phone receives the user's handwriting input and may determine whether the font content or the marking content is input currently according to the color of the object. The font content and the marking content may be better placed in suitable positions, thus greatly enhancing the user's experience.

In one embodiment, the electronic device may include an electronic device that supports handwriting input, such as, a tablet computer, a laptop, a mobile phone, a TV set, and the like. The method may better identify whether the user's current operation is the handwriting stroke operation or other operations based on the property information of the input, and may improve the identification accuracy and enhance the user's experience.

Figure 3:
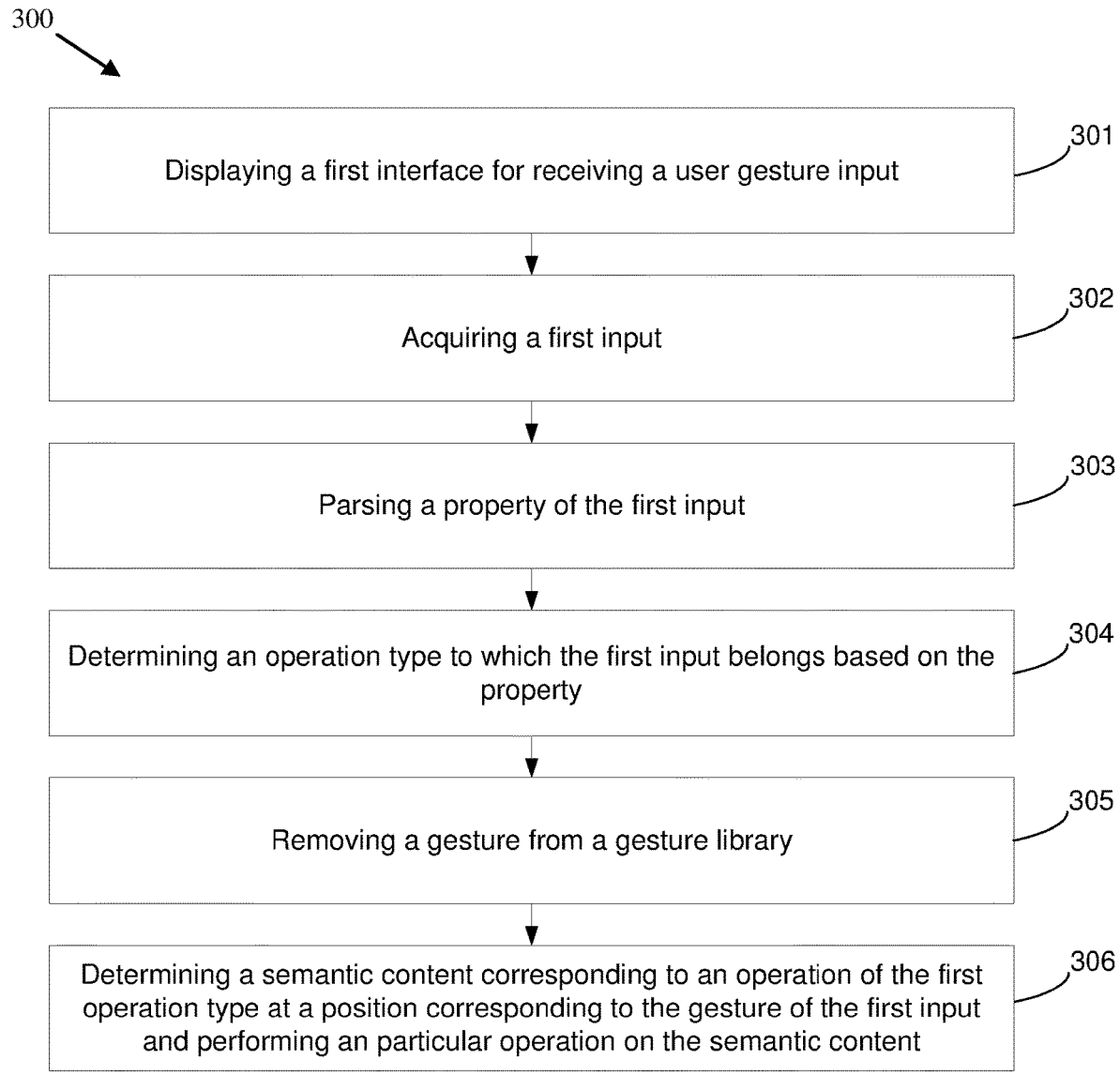
FIG. 3 is a flow diagram of an implementation of a further embodiment of a method for an electronic device.

FIG. 3 is a schematic flow diagram depicting one embodiment of a method 300 for an electronic device. The method 300 may be applied to an electronic device capable of receiving a user's input and displaying a gesture of the input in real time. In one embodiment, the method 300 may include displaying 301 a first interface for receiving a user's input, and displaying a gesture of the input in real time. In one embodiment, the electronic device may support a handwriting input method and a display screen of the electronic device may include a touch screen supporting a touch input.

In some embodiments, the first interface may be a part of the whole screen interface of the display screen. The lower part of the whole screen interface may be the first interface for performing the handwriting input and the upper part of the whole screen interface may display already edited content.

The method 300 may include acquiring 302 the first input, and displaying the gesture of the first input.

The method 300 may also include parsing 303 the property information of the first input. In one embodiment, the property information may include a color, a thickness, a shape, a position, a duration of a user gesture input, a system generation time, and/or an ending time of a line. In some embodiments, parsing 303 the property information of the first input may include detecting a touch point movement gesture on the touch screen, determining one continuous touch point movement gesture that is detected as one stroke, and/or parsing the property information of the stroke.

In one embodiment, the property information may be applied to various kinds of lines, text and/or elements, such as stroke properties.

The method 300 may include determining 304 an operation type to which the first input belongs based on the property information. In some embodiments, determining 304 the operation type of the first input according to the property information may include determining whether the property information satisfies a preset condition. If the property information satisfies the preset condition, the method 300 may determine that the first input is a first operation type. If the property information does not satisfy the preset condition, the method 300 may determine that the first input is a second operation type.

In one embodiment, the first operation type may mean that the first input includes a stroke operation of the handwriting input method and the second operation type may mean that the first input may include other operations distinguished from the stroke operation, e.g., the first input may represent an identification operation.

In one embodiment, the preset condition can include an interval range of at least one property value. The property value may include a color property value, a weight property value of a line, a size property value of a font, and/or the like. For example, if the preset condition includes that the color property value is a range of color values between a first color value and a second color value, the method 300 may determine whether the gesture color of the current input is within the range. If the gesture color of the current input is within the range, the method 300 may determine that the current input is the first operation type. If the gesture color of the current input is not within the range, the method 300 may determine that the current input is the second operation type.

In one example, if the preset condition is that the color property value is within a color range of a first color value and a second color value and the thickness property value of the line is within a thickness range of a first line value and a second line value, the method 300 may determine whether the gesture color and/or thickness of the current input falls within the one or more of the color range or thickness range. If both are conditions are satisfied, the method 300 may determine that the current input is the first operation type, otherwise, the method 300 may determine that the current input is the second operation type.

In one example, if the preset condition is that the color property value is within a color range of a first color value and a second color value or the thickness property value of the line is within a thickness range of a first line value and a second line value, the method 300 may determine whether the gesture color of the current input falls within the color range, or whether the gesture line of the current input falls within the thickness range. If one of the above-described conditions is satisfied, the method 300 may determine that the current input is the first operation type. If both of the above-described conditions are not satisfied, the method 300 may determine that the current input is the second operation type.

In one embodiment, the preset condition may include that a relative relationship between the property values of one or more properties of the first input operation and other input operations in a first range is within a preset range. The first range may include a range near a first position of the first input. The relative relationship may include an input over a period of time before or after the input of the first input. In one embodiment, if the difference between the property values is within a certain range, the input operation may be the first operation type. If the difference exceeds a certain range, the input operation may be the second operation type.

For example, if the preset condition is that the color property values of the first input operation and other input operations in the first range are the same, the method 300 may include determining the color of the current input operation and surrounding handwriting. If the color is the same, the method 300 may determine that the current input operation is the first operation type. If the color is different, the method 300 may determine that the current input operation is the second operation type.

For another example, if the preset condition is that the position property values of the first input operation and other input operations in the first range are within the preset range, the method 300 may determine the position of the currently input operation. If the relationship of the position of the current input corresponding to the positions of multiple of other handwritings is within the preset range, the method 300 may determine that the current input is the first operation type. Otherwise, the method 300 may determine that the current input is the second operation type. In some embodiments, the preset condition can be set before the user performs an input. The preset condition may be set when the user performs an input. The condition may be set after the user performs an input.

The method 300 includes, in response to the operation type being the second operation type, removing 305 the trajectory of the first input from the trajectory library on which the semantic identification is to be performed, and performing the semantic identification on the remaining trajectories.

In one embodiment, if it is determined that the first input is the second operation type, an identification distinguished from the handwriting stroke may be performed on the gesture of the first input to identify an identification correlated or matched with the gesture of the first input.

The method 300 includes determining 306 whether a semantic content corresponds to an operation of the first operation type at a position corresponding to the gesture of the first input, and performing a particular operation on the semantic content. In some embodiments, performing the particular operation on the semantic content may include marking the semantic content. The particular operation may include keeping the trajectory of the first input unchanged, and displaying the trajectory on the semantic content, controlling the semantic content to be displayed with an effect different from other contents or aggregating multiple semantic contents corresponding to multiple user gesture inputs to generate a new paragraph.

For example, the user may use a mobile phone to do math exercises. Before "a+b≥c" is input on the first interface of the mobile phone, the user may want to mark this formula since the formula may be a key step in problem-solving. The user may input an oblique line with a length less than 2 mm before inputting "a+b≥c", and the user may input an oblique line with a length less than 2 mm again after inputting "a+b≥c". The recognition engine in the mobile phone may receive the user's input and determine the two oblique lines are marking operations on the middle contents in response to the oblique lines less than 2 mm appearing before and after a certain input font. The display of the mobile phone may display an oblique line below "a+b≥c" to mark the math formula. The user may better distinguish the font content and the marking content and the font content and the marking content may better display in suitable positions, thus greatly enhancing the user's experience.

In one embodiment, the electronic device may include an electronic device that supports handwriting input, such as, a tablet computer, a laptop, a mobile phone, a TV set, or the like. The method 300 may better identify whether the user's current operation is the handwriting stroke operation or another operation, thus improving identification accuracy and enhancing the user's experience.

Figure 4:
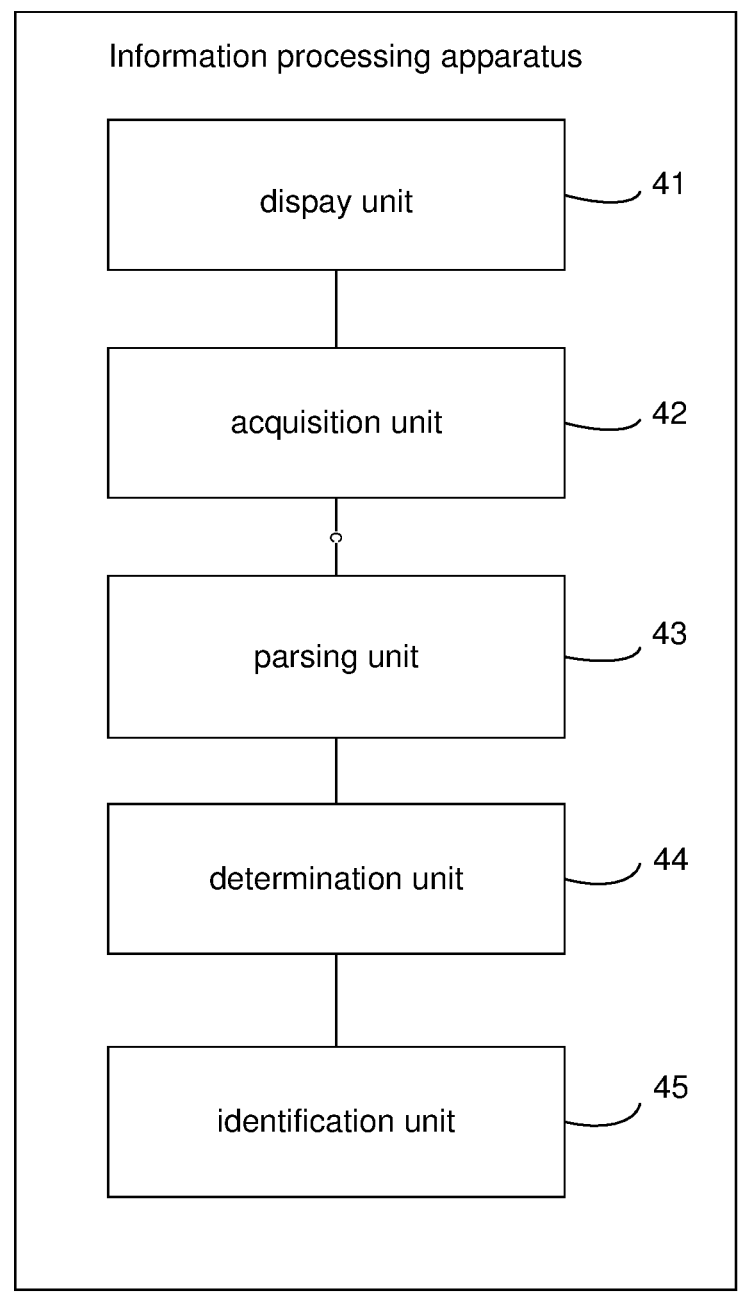
FIG. 4 is a schematic diagram of one embodiment of components of an information processing apparatus.

FIG. 4 is a structural schematic diagram of components of an information processing apparatus 400 (e.g., electronic device). The information processing apparatus 400 may be capable of receiving a user's input and displaying a gesture of the user in real time. The information processing apparatus 400 may include a display unit 41, an acquisition unit 42, a parsing unit 43, a determination unit 44, and an identification unit 45. The display unit 41 may display a first interface for receiving a user's input, and display a gesture of the input in real time. The acquisition unit 42 may acquire a first input, the gesture of which is displayed by the display unit 41. The parsing unit 43 may parse a property of the first input. The determination unit 44 may determine an operation type to which the first input belongs based on the property. The identification unit 45 may identify the first input based on the operation type.

In some embodiments, the property may include a color, a thickness, a shape, a duration of a user input gesture, a system generation time, and/or an ending time of a line. The determination unit 44 may determine whether the property satisfies a preset condition. If the property satisfies the preset condition, the determination unit 44 may determine that the first input is a first operation type. If the property does not satisfy the preset condition, the determination unit 44 may determine that the first input is a second operation type.

In some embodiments, the identification unit 45 may, in response to the operation type being the first operation type, add the trajectory of the first input to a trajectory library on which a semantic identification is to be performed, perform the semantic identification on the first input, and/or output identified text.

In one embodiment, the identification unit 45 may, in response to the operation type being the second operation type, remove the trajectory of the first input from the trajectory library on which the semantic identification is to be performed, and perform the semantic identification on the remaining trajectories.

The information processing apparatus 400, in one embodiment, may better identify whether the user's current operation is the handwriting stroke operation or another operation, thus improving identification accuracy and enhancing the user's experience.

Figure 5:
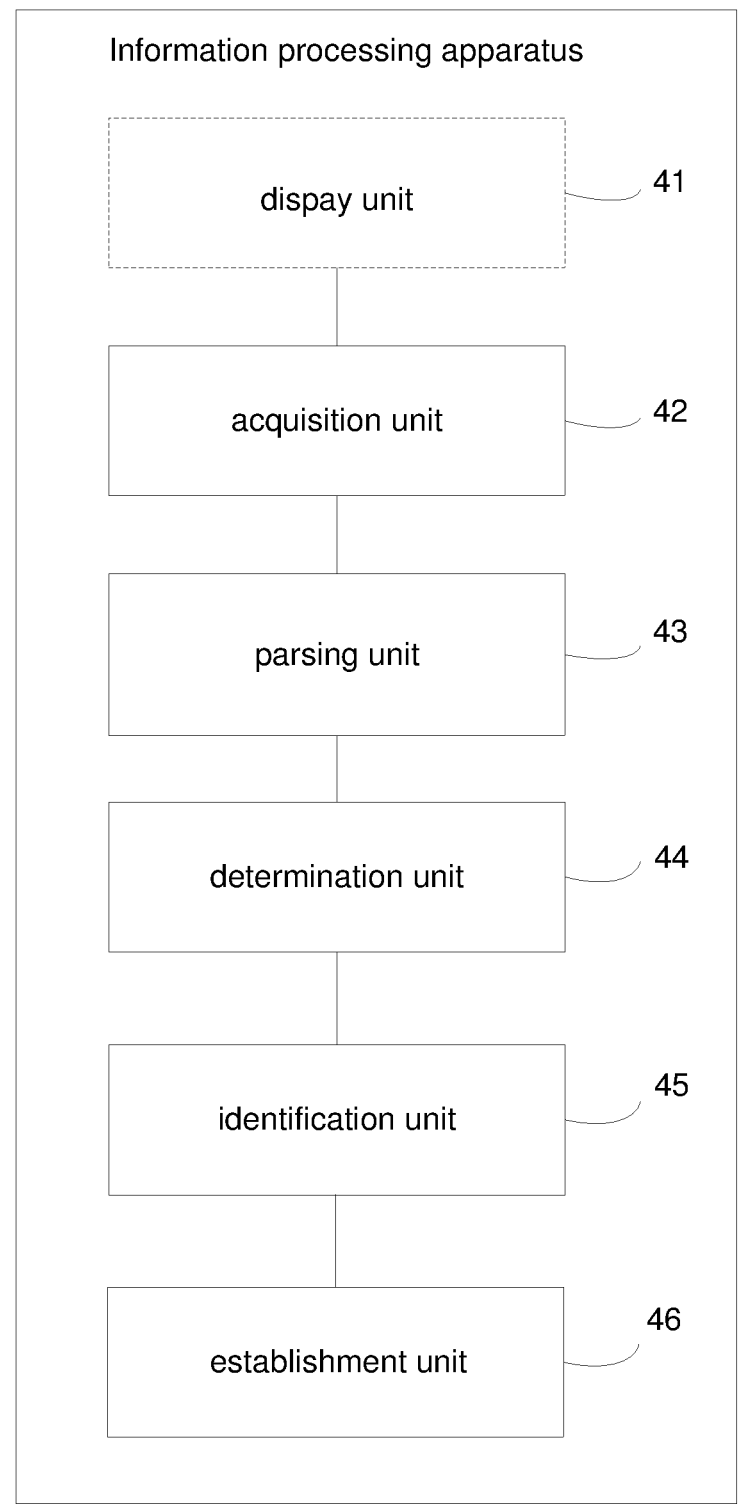
FIG. 5 is a schematic diagram of another embodiment of components of an information processing apparatus.

FIG. 5 is a structural schematic diagram depicting one embodiment of components of an information processing apparatus 500 (e.g., electronic device). The information processing apparatus 500 may include a display unit 41, an acquisition unit 42, a parsing unit 43, a determination unit 44, an identification unit 45, and an establishment unit 46. The establishment unit 46 may pre-establish a property information database which may store property information. The property information may include a color, a thickness, a shape, a duration of a user gesture input, a system generation time, and/or an ending time of a line. The display unit 41 may display a first interface for receiving a user's input and display a gesture of the input in real time. The acquisition unit 42 may acquire a first input, the gesture of which is displayed by the display unit 41. The parsing unit 43 may parse a property of the first input. The determination unit 44 may determine an operation type to which the first input belongs based on the property. The identification unit 45 may identify or recognize the first input according to the operation type.

In one embodiment, the acquisition unit 42 may receive a selection operation of the user. The selection operation may be used to indicate a property of various types of inputs. In some embodiments, the user may retrieve the property information database on the first interface and select different property parameters for the first and second operation types respectively.

In one embodiment, the first operation type may mean that the first input includes a stroke operation of the handwriting input method. The second operation type may mean that the first input may include other operations distinguished from the stroke operation, e.g., the first input may represent an identification operation.

In some embodiments, the determination unit 44 may determine whether the property satisfies a first preset condition. If the property satisfies a first preset condition, the determination unit 44 may determine that the first input is the first operation type. If the first preset condition is not satisfied, the determination unit 44 may determine whether the property satisfies a second preset condition. If the second preset condition is satisfied, the determination unit 44 may determine that the first input is the second operation type. In one embodiment, the first preset condition may include a set of property parameters set for the first operation type, and the second preset condition may include a set of property parameters set for the second operation type.

In some embodiments, the identification unit 45 may, in response to the operation type being the first operation type, add the trajectory of the first input to a trajectory library on which a semantic identification is to be performed, perform the semantic identification on the first input, and output identified text. In one embodiment, the identification unit 45 may, in response to the operation type being the second operation type, remove the trajectory of the first input from the trajectory library on which the semantic identification is to be performed, and perform the semantic identification on the remaining trajectories.

The information processing apparatus 500 may better recognize whether the user's current operation is the handwriting stroke operation or another operation, thus improving recognition accuracy and enhancing the user's experience.

Figure 6:
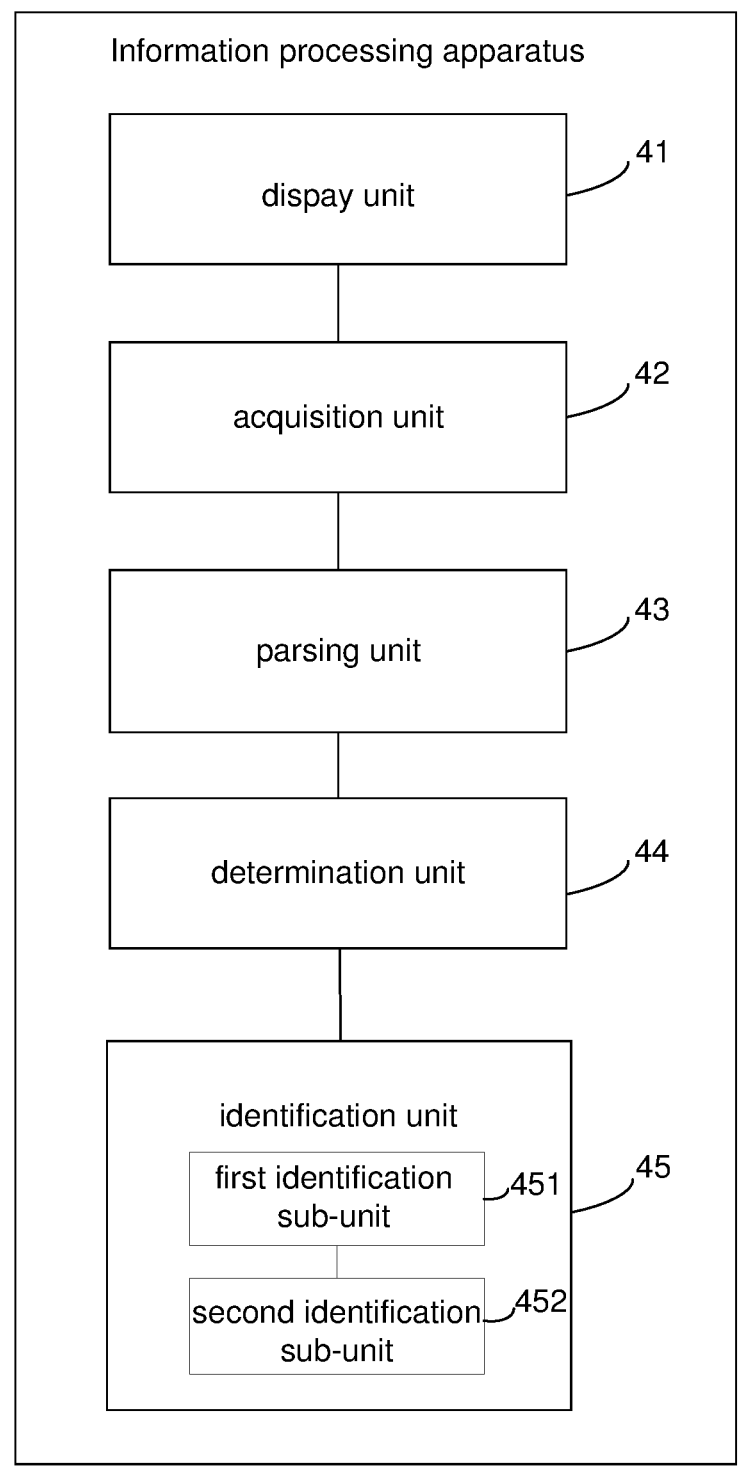
FIG. 6 is a schematic diagram of a further embodiment of components of an information processing apparatus.

FIG. 6 is a structural schematic diagram that depicts one embodiment of an information processing apparatus 600 (e.g., electronic device). The information processing apparatus 600 may be capable of receiving a user's input and displaying a gesture of the user in real time. The information processing apparatus 600 may include a display unit 41, an acquisition unit 42, a parsing unit 43, a determination unit 44, and an identification unit 45 including a first identification sub-unit 451 and a second identification sub-unit 452. The display unit 41 may display a first interface for receiving a user's input and display a gesture of the input in real time. The acquisition unit 42 may acquire a first input, the gesture of which is displayed by the display unit 41. The parsing unit 43 may parse property information of the first input. The determination unit 44 may determine an operation type to which the first input belongs according to the property information. The identification unit 45 may identify or recognize the first input according to the operation type.

In one embodiment, the property information may include a color, a thickness, a shape, a duration of a user gesture input, a system generation time, and/or an ending time of a line. The determination unit 44 may determine whether the property satisfies a preset condition. If the property satisfies the preset condition, the determination unit 44 may determine that the first input is a first operation type. If the property does not satisfy the preset condition, the determination unit 44 may determine that the first input is a second operation type.

In one embodiment, the first identification sub-unit 451 may, in response to the operation type being the first operation type, add the trajectory of the first input to a trajectory library on which a semantic identification is to be performed, perform the semantic identification on the first input, and output identified text.

In some embodiments, the second identification sub-unit 452 may, in response to the operation type being the second operation type, remove the trajectory of the first input from the trajectory library on which the semantic identification is to be performed, and perform the semantic identification on the remaining trajectories.

Those skilled in the art may understand that the functions of the units in the information processing apparatus 600 may be understood by referring to the related descriptions of the foregoing methods. The units of the information processing apparatus 600 may be implemented by an analog circuit which implements the functions described in this embodiment or may be implemented by running software which performs the functions described in this embodiment on an intelligent terminal.

In a practical application, the specific structures of the display unit 41, the acquisition unit 42, the parsing unit 43, the determination unit 44, the identification unit 45, and the sub-units of the identification unit 45 can correspond to one or more processors. The structures of the processors may include electronic elements with processing functions or a set of electronic elements, such as CPU, MCU, DSP or PLC and the like. The processor may include executable code that is stored in a storage medium. The processor may connect with the storage medium through a communication interface such as a bus or the like to read the executable code from the storage medium and execute the executable code during the performing of corresponding functions of the specific modules. A part of the storage medium for storing the executable code may be a non-transitory storage medium.

The display unit 41, the acquisition unit 42, the parsing unit 43, the determination unit 44, the identification unit 45, and the sub-units of the identification unit 45 can correspond to an identical processor that may employ time division to process corresponding functions of the touch display unit 102, the acquisition unit 202, the parsing unit 204, the determination unit 206, and the identification unit 208. In one embodiment, the units 41-45 or the sub-units of the identification unit 45 may correspond to different processors respectively The information processing apparatus 600 described may better identify whether the user's current operation is the handwriting stroke operation or another operation, thus improving identification accuracy and enhancing the user's experience. As used herein, the terms property and property information may be used interchangeably.

In the several embodiments provided in present disclosure, it should be understood that the disclosed method, device, or information processing apparatus (e.g., electronic device) may be implemented in other ways. The above-described device embodiments are only illustrative. For example, the unit division may be merely logical function division and there may be other divisions in actual implementation. For example, multiple units or components may be combined or integrated into another system, or some features may be ignored or not performed. Additionally, coupling, direct coupling, or communication connections among the component parts as shown or discussed may be implemented through some interface(s), and indirect coupling or communication connections of devices or units may be in an electrical, mechanical, or another form.

The above-mentioned units illustrated as separate components may be or may not be separated physically and the components displayed as the units may be or may not be physical units. In some embodiments, the components may be located in one place or distributed over multiple network units. A part of or all of the units thereof may be selected based on the actual demands to achieve the embodiments.

In some embodiments, various functional units of various embodiments may be integrated in one processing unit or each unit may function as a single unit. Two or more units may be integrated in one unit. The integrated units may be implements by hardware, or by a functional unit with hardware and software.

A person skilled in the art should understand that all or certain steps of the methods may be accomplished by relevant hardware via program commands. The program may be stored in a readable storage media of a computer. The storage media may include mobile storage devices, read-only memories (ROM), random access memories (RAM), diskettes or disks and other various types of media of program code storage or the like.

The units may be stored in a computer readable storage medium. Based on such understandings, the technical solutions or part of the technical solutions of the embodiments of the present disclosure may be essentially embodied in the form of software products. The computer software products may be stored in a storage medium, including several instructions to cause a computer apparatus (which can be a personal computer, server, or network apparatus, etc.) to perform all or part of the methods described in each embodiment of the present disclosure. The above-mentioned storage medium may include various mediums, such as a mobile storage apparatus, a ROM, a RAM, a magnetic disk, or an optical disk and the like capable of storing program code.

The above are only particular implementations of the present disclosure, and the protection scope of the present disclosure is not limited thereto. It will readily occur to those skilled in the art, within the technical scope disclosed by the present disclosure, that changes or substitutions should be covered within the protect scope of the present disclosure. Accordingly, the protection scope of the present disclosure is defined by the claims.

What is claimed is:

1. An electronic device, comprising:
a touch display unit that is configured to receive and display a first handwriting input in real-time, the first handwriting input selected from:
a first operation type comprising an independent stroke operation for inputting character content selected from characters, symbols, letters, numbers, the first operation type having a preset range of one or more selected input properties selected from stroke color, stroke thickness, stroke shape, stroke speed, stroke linecap, stroke dasharray, and combinations thereof; and
a second operation type comprising an interdependent stroke operation for adding marking for the character content, the marking selected from underlining, punctuation, and combinations thereof, the second operation type having one or more selected input properties that fall outside the preset range of input properties for the first operation type;
a processor coupled to the touch display unit that, in response to the touch display unit receiving a second handwriting input, is configured to:
determine an operation type for the second handwriting input based at least in part on whether the one or more selected input properties for the second handwriting input satisfy a preset condition of falling within the preset range for the first operation type; and
cause the touch display unit to display the second handwriting input in accordance with the operation type determined by the processor.

2. The electronic device of claim 1, wherein the processor is configured to determine that the second handwriting input is the first operation type in response to the one or more selected input properties falling within the preset range for the first operation type; and
otherwise, to determine that the second handwriting input is the second operation type.

3. The electronic device of claim 2, wherein the processor is configured, in response to determining that the operation type of the second handwriting input is the first operation type, to:
add a trajectory of the input to a trajectory library;
perform semantic identification on the second handwriting input; and
output text identified based on the semantic identification to the touch display.

4. The electronic device of claim 2, wherein the processor is configured, in response to determining that the operation type is the second operation type, to:
remove the trajectory of the user input from the trajectory library; and
perform the semantic identification on the remaining trajectories of the trajectory library.

5. The electronic device of claim 4, wherein the processor is configured to determine a semantic content corresponding to an operation of the first operation type at a position corresponding to the trajectory of the second handwriting input, and perform the operation on the semantic content.

6. The electronic device of claim 5, wherein the processor performing the operation on the semantic content comprises:
the processor marking the semantic content; and
at least one of:
keeping the trajectory of the second handwriting input unchanged, and displaying the trajectory on the semantic content;
controlling the semantic content to be displayed with an effect different from one or more other contents; and
aggregating a plurality of semantic contents corresponding to a plurality of second handwriting inputs having the same operation type to generate a new paragraph.

7. A method comprising:
displaying a first interface for receiving a user input;
acquiring, by processor, a first handwriting input;
parsing, by processor, one or more selected properties of the first handwriting input, the properties selected from stroke color, stroke thickness, stroke shape, stroke speed, stroke linecap, stroke dasharray, and combinations thereof;
determining, by processor, an operation type for the first handwriting input, the operation type selected from a first operation type comprising an independent stroke operation for inputting character content selected from characters, numbers, symbols, and combinations thereof, and a second operation type comprising an interdependent stroke operation for adding marking for the character content, the marking selected from underlining, punctuation, and combinations thereof the operation type determined based at least in part on whether the one or more selected input properties of the first handwriting input fall within a preset range for the one or more properties for the first operation type; and
recognizing by the processor and displaying the first input according to the operation type.

8. The method of claim 7, further comprising:
acquiring, by processor, a second handwriting input;
determining in response to one or more selected properties of the second handwriting input falling with the preset range for the first operation type that the second handwriting input the first operation type; and
otherwise determining that the second handwriting input is a second operation type.

9. The method of claim 8, further comprising, in response to determining that the second handwriting input is a first operation type:
adding a trajectory of the second handwriting input to a trajectory library;
performing semantic identification on the second handwriting input; and
outputting text identified based on the semantic identification.

10. The method of claim 9, further comprising, in response to determining that the second handwriting input is a second operation type:
removing the trajectory of the first second handwriting input from the trajectory library; and
performing the semantic identification on the remaining trajectories of the trajectory library.

11. The method of claim 10, further comprising determining a semantic content corresponding to an operation of the first operation type at a position corresponding to the gesture of the second handwriting input, and performing the operation on the semantic content.

12. The method of claim 11, wherein performing the operation on the semantic content comprises:
  marking the semantic content; and
  at least one of:
    keeping the trajectory of the first input unchanged, and displaying the first input on the semantic content;
    controlling the semantic content to be displayed with an effect different from other contents; and
    aggregating a plurality of semantic contents corresponding to a plurality of user inputs to generate a new paragraph.

13. A program product comprising a non-transitory computer readable storage medium that stores code executable by processor to:
  receive, from a touchscreen display, a first handwriting input selected from:
    a first operation type comprising an independent stroke operation for inputting character content selected from characters, symbols, letters, numbers, and combinations thereof, the first operation type having a preset range of one or more selected input properties selected from stroke color, stroke thickness, stroke shape, stroke speed, stroke linecap, stroke dasharray, and combinations thereof; and
    a second operation type comprising an interdependent stroke operation for adding marking for the character content, the marking selected from underlining, punctuation, and combinations thereof, the second operation type having one or more selected input properties that fall outside the preset range of input properties for the first operation type;
  receive, from the touchscreen display, a second handwriting input:
  determine an operation type for the second handwriting input based at least in part on whether the one or more selected input properties for the second handwriting input satisfy a preset condition of falling within the preset range for the first operation type;
  cause the touchscreen display to display the second handwriting input in accordance with the operation type determined.

14. The program product of claim 13, wherein the code is further executable by processor to:
  determine that the second handwriting input is the first operation type in response to the one or more selected input properties falling within the preset range for the first operation type; and
  otherwise, determine that the second handwriting input is the second operation type.

15. The program product of claim 14, wherein the code is further executable by processor to:
  in response to determining that the operation type of the second handwriting input is the first operation type:
    add a trajectory of the input to a trajectory library;
    perform semantic identification on the second handwriting input; and
    output text identified based on the semantic identification to the touchscreen display.

16. The program product of claim 15, wherein the code is further executable by processor to:
  in response to determining that the operation type of the second handwriting input is the second operation type:
    remove the trajectory of the user input from the trajectory library; and
    perform the semantic identification on the remaining trajectories of the trajectory library.

17. The program product of claim 16, wherein the code is further executable by processor to:
  determine a semantic content corresponding to an operation of the first operation type at a position corresponding to the trajectory of the second handwriting input; and
  perform the operation on the semantic content.

18. The program product of claim 17, wherein the code is further executable by processor to:
  mark the semantic content in response to determining that the operation type is the second operation type; and
  perform at least one of:
    keeping the trajectory of the second handwriting input unchanged, and displaying the trajectory on the semantic content;
    controlling the semantic content to be displayed with an effect different from one or more other contents; and
    aggregating a plurality of semantic contents corresponding to a plurality of the second handwriting inputs, the plurality of the second handwriting inputs being the same operation type, to generate a new paragraph.

* * * * *